United States Patent [19]

Sharpe

[11] 4,267,694
[45] May 19, 1981

[54] STAGED INDUCTION ENGINE

[76] Inventor: Thomas H. Sharpe, 502 Dorr Ave., Belvedere, S.C. 29841

[21] Appl. No.: 83,394

[22] Filed: Oct. 10, 1979

[51] Int. Cl.³ .............................................. F02K 7/10
[52] U.S. Cl. ................................................... 60/269
[58] Field of Search .................... 60/269, 39.48, 39.52

[56] References Cited

U.S. PATENT DOCUMENTS

| | | | |
|---|---|---|---|
| 3,323,304 | 6/1967 | Llobet et al. | 60/269 |
| 3,680,317 | 8/1972 | Kotoc | 60/269 |
| 3,800,531 | 4/1974 | Sharpe | 60/269 |
| 3,841,090 | 10/1974 | Sharpe | 60/269 |

Primary Examiner—Robert E. Garrett
Attorney, Agent, or Firm—B. J. Powell

[57] ABSTRACT

A staged induction engine with an air duct therethrough open at both ends, and defining a plurality of venturis therein axially spaced from each other where each of the venturis has a throat of a diameter smaller than the throat of the next upstream of venturis, a burner unit defining combustion chamber therein, exhaust jet pumping means operatively associated with the exhaust gases from the burner unit and including a plurality of venturi jet pumping tubes corresponding in number to the venturis with each of said venturi jet pumping tubes defining an exhaust passage therethrough in communication with the exhaust gases from the combustion chamber with a downstream exhaust outlet from which the exhaust gases are discharged where one of the exhaust outlets is positioned upstream of the throat of each of the venturis so that the exhaust gases will be discharged through the throat of the venturi associated therewith to force in the air passage through the air duct upstream of the venturi through the venturi under jet pumping action, and means for supplying a combustible air/fuel mixture to the burner unit to operate same.

8 Claims, 8 Drawing Figures

STAGED INDUCTION ENGINE

BACKGROUND OF THE INVENTION

Jet engines which use a combination of impaction and induction to supply the combustible air mixture to the combustion chamber in the jet engine have been proposed. This type of engine is illustrated in my earlier U.S. Pat. Nos. 4,085,585 and 4,118,929. One of the problems with this type of engine is that it is difficult to achieve sufficient velocities in the fresh air flowing through the engine to adequately supply the combustion chamber with a combustible air mixture and generate adequate thrust. This is especially true at low speeds. This application is directed to an improvement over my earlier patents enumerated above.

SUMMARY OF THE INVENTION

These and other problems and disadvantages associated with the prior art are overcome by the invention disclosed herein by providing a means whereby sufficient fresh air flow is generated to supply the necessary combustible air mixture to the burner in the engine to operate it. This is accomplished by using the exhaust gases from the combustion chamber to inductively force the fresh air through the engine using jet pumping action.

The apparatus of the invention includes an air duct with an air passage through it open to the atmosphere at its leading and trailing ends, and in which is positioned a burner unit and an exhaust jet pumping means. The air passage through the air duct has an inlet section adjacent its leading end and a nozzle section at its trailing end with the nozzle section being of the smaller diameter than the inlet section. The air passage has a converging section which connects the inlet section with the nozzle section. The converging section is provided with a plurality of venturis which are axially spaced along the length of the converging section with the throat of each of the venturis having a diameter smaller than the throat diameter of the next upstream venturi. The exhaust jet pumping means has a plurality of jet pumping tubes which connect the exhaust gases from the burner unit with the venturis in the converging section so as to generate a jet pumping action to force the fresh air through the air duct. Each of the jet pumping tubes has a passage through it which communicates with the exhaust gases from the combustion chamber at its inlet end and which discharges the exhaust gases from its outlet end through one of the venturis in the converging section of the air duct so that the high speed exhaust gases exiting from the jet pumping tube induces air through the venturi section in the air duct to force fresh air therethrough. One of the jet pumping tubes is associated with each of the venturis so that a staged jet pumping action is provided. A plurality of impaction/induction vanes are located in the fresh air duct so that a portion of the fresh air being forced through the fresh air duct will impact into the vanes to be supplied to the combustion chamber. These vanes are also operatively associated with the exhaust gases passing out of the jet pumping tubes so that some of the exhaust gases are directed into the vanes and serve to induce additional fresh air into the vanes to be supplied to the combustion chamber.

These and other features and advantages of the invention will become more fully understood upon consideration of the following specification and accompanying drawings wherein like characters of reference disignate corresponding parts throughout the several views and in which:

Figure 1A:
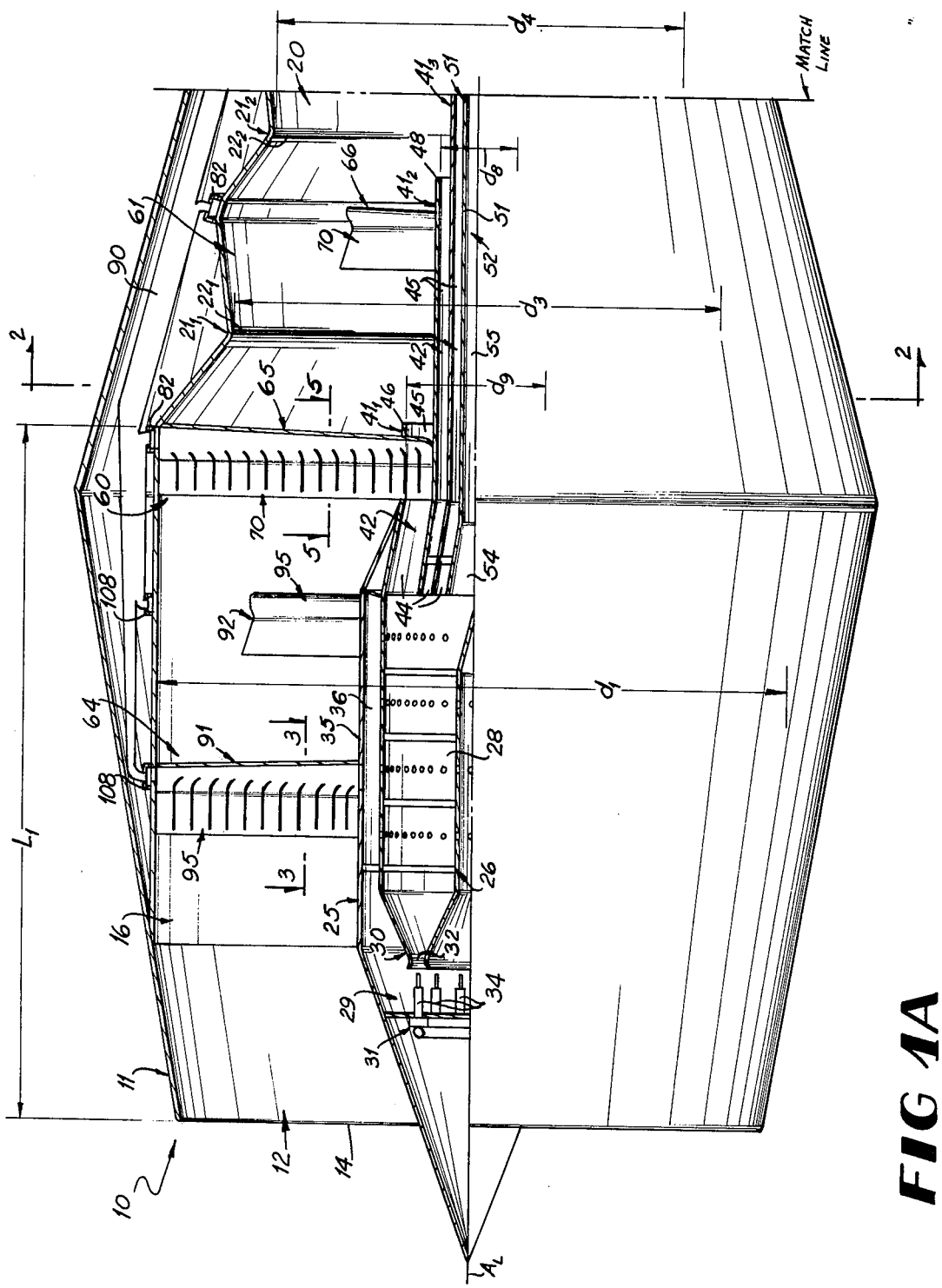
FIGS. 1A and 1B are a matched side view of one embodiment of the invention shown partly in cross-section.

These figures and the following detailed description disclose specific embodiments of the invention; however, it is to be understood that the inventive concept is not limited thereto since it may be embodied in other forms.

DETAILED DESCRIPTION OF ILLUSTRATIVE EMBODIMENTS

Referring to the figures, it will be seen that the invention is incorporated in an engine 10. The engine 10 includes a tubular housing 11 which defines a fresh air passage 12 therethrough open to the atmosphere at its leading upstream end 14 and its trailing downstream end 15. The fresh air passage 12 has an axial center line $A_L$. The fresh air passage 12 includes an inlet section 16 with a major diameter $d_1$ and which extends from the leading end 14 toward the trailing end 15 of housing 11 with a length $L_1$ less than the length of the fresh air passage 12. The fresh air passage 12 has a converging-/diverging nozzle section 18 at the trailing end 15 thereof with a venturi throat 19 of minimum diameter $d_2$ substantially less than the diameter $d_1$ of the inlet section 16. The air passage 12 has a converging section 20 which tapers inwardly from the inlet section 16 to the nozzle section 18. The converging section 20 is provided with a plurality of venturi subsections 21 which are axially spaced along the length of the converging section 20. While different numbers of venturi subsections 21 may be used, three such venturi subsections 21 are illustrated and have been individually designated $21_1$–$21_3$. The venturi subsections 21 are arranged concentrically of the longitudinal axis $A_L$ of the passage 12. Each of the venturi subsections 21 defines a venturi throat 22 therethrough individually referenced $22_1$–$22_3$ so that the diameter of the opening through each venturi throat 22 is smaller than that of the next upstream venturi subsection 21. For instance, the venturi throat $22_1$ has a diameter $d_3$, venturi throat $22_2$ has a diameter $d_4$, and venturi throat $22_3$ has a diameter $d_5$. It will be noted that the diameter $d_3$ is less than the diameter $d_1$ of the inlet section 16 of the fresh air passage, that the diameter $d_4$ is less than the diameter $d_3$, and the diameter $d_5$ is less than the diameter $d_4$ but greater than the diameter $d_2$ of the venturi throat 19 in the nozzle section 18. Thus, it will be seen that the fresh air flowing through the fresh air passage 12 from the leading end 14 to the trailing end 15 will sequentially pass through the venturi throats 22 and finally out through the nozzle section 18.

A burner unit 25 is mounted in the housing 11 in the inlet section 16 of the fresh air passage 12 so that the burner unit 25 is concentric of the axis $A_L$ of the passage 12. The burner unit 25 includes a burner can assembly 26 defining an annular combustion chamber 28 therein. A combustion jet pump unit 29 is located at the inlet end of the burner can assembly 26 and defines a pumping venturi 30 therethrough so that a combustible air mixture can be forced therethrough into the combustion chamber 28. A jet pump injector assembly 31 is located just upstream of the venturi throat 32 in the pumping venturi 30. The injector assembly 31 includes a plurality of injector nozzles 34 aligned with the venturi throat 32 through the pumping venturi 30. Fuel pumped through the injector nozzles 34 will be forced through the venturi 32 under a sufficiently high pressure and velocity to force a combustible air mixture through the venturi throat 32 into the combustion chamber 28 in burner can assembly 26 to support combustion as will become more apparent.

The burner unit 25 also includes an outer chamber wall 35 around the burner can assembly 26 and the pumping venturi 30 to define a transfer chamber 36 therein about the burner can assembly 26 and the jet pump unit 29. A combustible air mixture is supplied to the transfer chamber 36 as will become more apparent so that this combustible air mixture will be forced into the combustion chamber 28 by the jet pumping action of the fuel to form a combustible air/fuel mixture for burning in the combustion chamber 28. The downstream end of the burner can assembly 26 forms the outlet from the burner unit 25 through which the exhaust gases pass from the burner unit 25 in a direction toward the trailing end 15 of the fresh air passage 12. It will be seen that the outside diameter of the burner unit 25 is sufficiently smaller than the diameter $d_1$ of the inlet section 16 of the air passage 12 that fresh air can freely flow therearound through the fresh air passage 12.

An exhaust jet pumping assembly 40 is operatively associated with the downstream end of the burner can assembly 26 to receive the exhaust gases passing out of the burner can assembly 26. The exhaust jet pumping assembly 40 is operatively associated with the venturi throats 22 in the venturi subsections 21 so that the exhaust gases cause fresh air to be induced through the venturi throats 22 by jet pumping action. The exhaust jet pumping assembly 40 is also operatively associated with the nozzle section 18 to cause air and exhaust gases upstream of the venturi throat 19 in nozzle section 18 to be forced therethrough by jet pumping action.

The exhaust jet pumping assembly 40 includes a plurality of venturi jet pumping tubes 41 all communicating with the exhaust gases passing out of the burner can assembly 26 at their upstream ends and respectively associated with one of the venturi throats 22 in the venturi subsections 21 at their downstream ends. While different numbers of venturi jet pumping tubes 41 may be used, three tubes are illustrated and are respectively numbered $41_1$–$41_3$. These tubes 41 correspond in number to the venturi subsections 21 as will become more apparent. Each of the venturi jet pumping tubes 41 is provided with central passage 42 therethrough, each of which is provided with a converging inlet section 44 at its upstream end communicating with the exhaust gases in the burner can assembly 26 and a generally constant diameter downstream section 45 communicating with the smaller end of the converging section 44. It will be seen that the pumping tubes $41_1$–$41_3$ are concentrically arranged about each other with the pumping tube $41_3$ being the innermost tube and the tube $41_1$ being the outermost tube. The constant diameter downstream section 45 of the innermost tube $41_3$ has a diameter $d_6$, the downstream section 45 of the next outboard tube $41_2$ has a diameter $d_8$ larger than the diameter $d_6$, and the downstream section 45 of the outermost tube $41_1$ has a diameter $d_9$ larger than the diameter $d_8$.

The exhaust jet pumping assembly 40 also includes a nozzle jet pumping tube 51 located inside the venturi jet jumping tube $41_3$ concentrically thereof. The nozzle jet pumping tube 51 also has a central passage 52 therethrough with a converging inlet section 54 at its upstream end communicating with the exhaust gases in the burner can assembly 26 and a generally constant diameter downstream section 55 communicating with the smaller end of the converging section 54. The downstream section 55 has a diameter $d_{10}$ smaller than diameter $d_6$ of the innermost venturi jet pumping tube $41_3$.

Because the venturi jet pumping tubes 41 are concentric about each other and about the nozzle jet pumping tube 51, it will be seen that the passage 52 through the nozzle jet pumping tube 51 is circular in cross-section while the passages 42 in the venturi jet pumping tubes are annular in cross-section. It will also be noted that the upstream end of the outermost venturi jet pumping tube $41_1$ joins with the trailing end of the burner unit 25 so that all of the exhaust gases from the combustion chamber 28 in the burner can assembly 26 must pass through the passages 42 in the venturi jet pumping tubes 41 and the passage 52 in the nozzle jet pumping tube 51.

The outermost venturi jet pumping tube $41_1$ has a length such that its discharge end 46 is located just upstream of the throat $22_1$ in the venturi subsection $21_1$. The next venturi jet pumping tube $41_2$ has a length such that the tube $41_2$ projects downstream through the discharge end 46 of tube $41_1$ and such that the discharge end 48 of tube $41_2$ is located just upstream of the throat $22_2$ in the venturi subsection $21_2$. The innermost venturi jet pumping tube $41_3$ has a length such that it projects downstream through the discharge end 48 of tube $41_2$ and such that the discharge end 49 of tube $41_3$ is located just upstream of the throat $22_3$ in the venturi subsection $21_3$. The nozzle jet pumping tube 51 has a length such that it projects downstream through the discharge end 49 of tube $41_3$ and such that it is located just upstream of the venturi throat 19 in the nozzle section 18. The diameter $d_{10}$ of the passage 52 through the nozzle jet pumping tube 51 is selected to cause the high velocity exhaust gas stream being discharged from the discharge end 50 of the tube 51 through the venturi throat 19 in nozzle section 18 to induce air in the air passage 12 upstream of the nozzle section 18 through the venturi throat 19 and out of the nozzle section 18 by jet pumping action. The diameter $d_6$ of the passage 42 through the innermost venturi jet pumping tube $41_3$ is selected to cause the high velocity exhaust gas stream being discharged from the discharge end 49 thereof around the nozzle jet pumping tube 51 through the throat $22_3$ in the venturi subsection $21_3$ to induce air in the air passage 12 upstream of the venturi subsection $21_3$ through the venturi throat $22_3$ by jet pumping action. The diameter $d_8$ of the passage 42 through the next venturi pumping tube $41_2$ is selected to cause the high velocity exhaust gas stream being discharged from the downstream end 48 thereof around the innermost venturi jet pumping tube $41_3$ through the throat $22_2$ in the venturi subsection $21_2$ to induce air in the air passage 12 upstream of the venturi subsection $21_2$ through the venturi throat $22_2$ by jet pumping action. The diameter $d_6$ of the passage 42 through the outermost venturi jet pumping tube $41_1$ is selected to cause the high velocity exhaust gas stream being discharged from the downstream end 46 thereof around the venturi jet pumping tube $41_2$ through the throat $22_1$ in the venturi subsection $21_1$ to induce fresh air in the air passage 12 upstream of venturi subsection $21_1$ through the throat $22_1$. Thus, it will be seen that the exhaust gases from tube $41_1$ induce fresh air through venturi subsection $21_1$, that the exhaust gases from tube $41_2$ induce the fresh air/exhaust gas mixture from venturi section $22_1$ through the venturi section $22_2$, that the exhaust gases from tube $41_3$ induce the fresh air/exhaust gas mixture from venturi section $22_2$ through the venturi section $22_3$, and that the exhaust gases from tube 51 induce the fresh air/exhaust gas mixture from the venturi section $22_3$ through the nozzle section 18. The induction process is thusly staged and cumulative so that maximum use of the exhaust gases is achieved in inducing fresh air through the air passage 12 while the thrust generated thereby is maximized.

Figures 1B, 8:
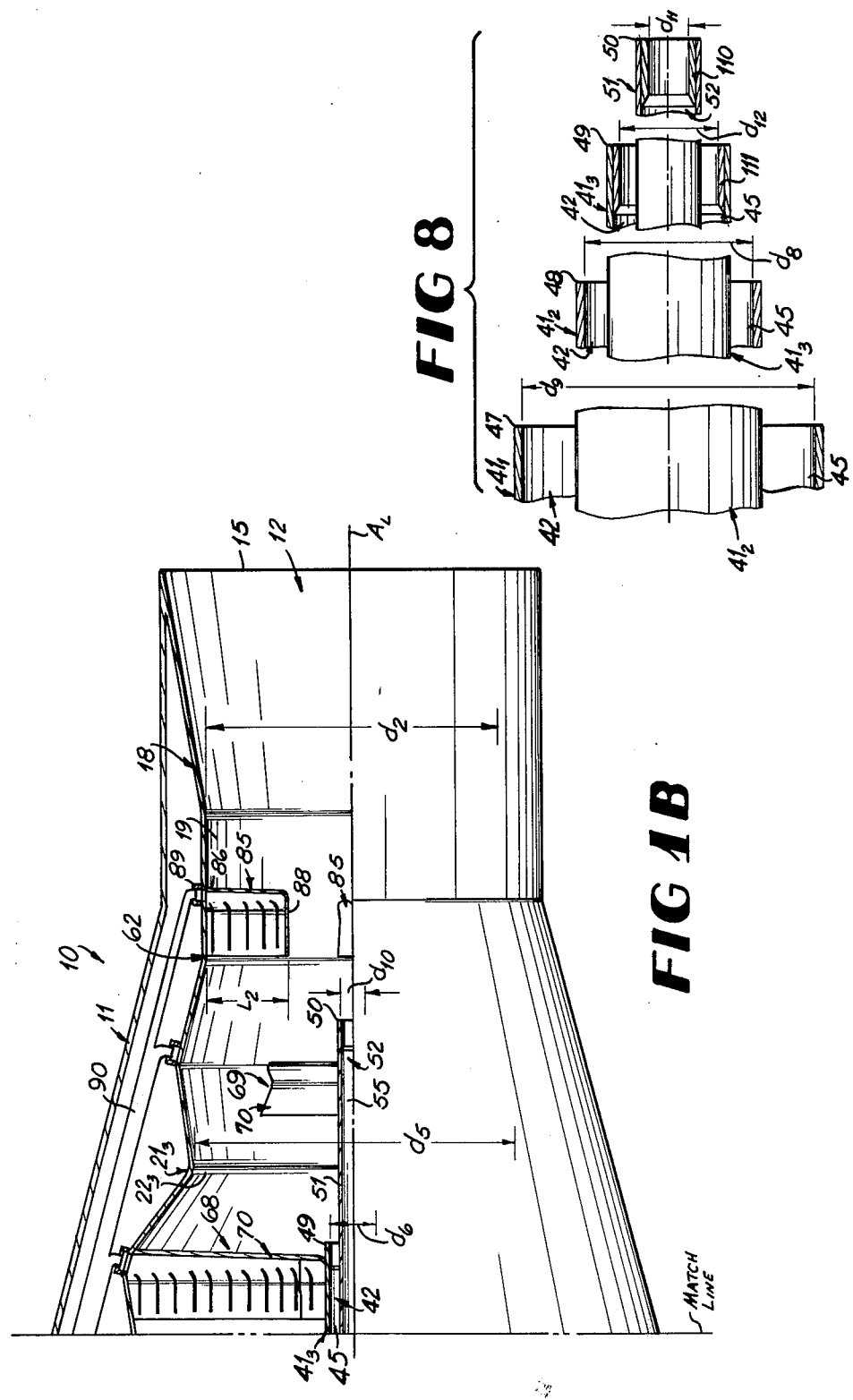
FIG. 8 is a fragmentary view of the jet pumping tubes of the invention.
Figure 2:
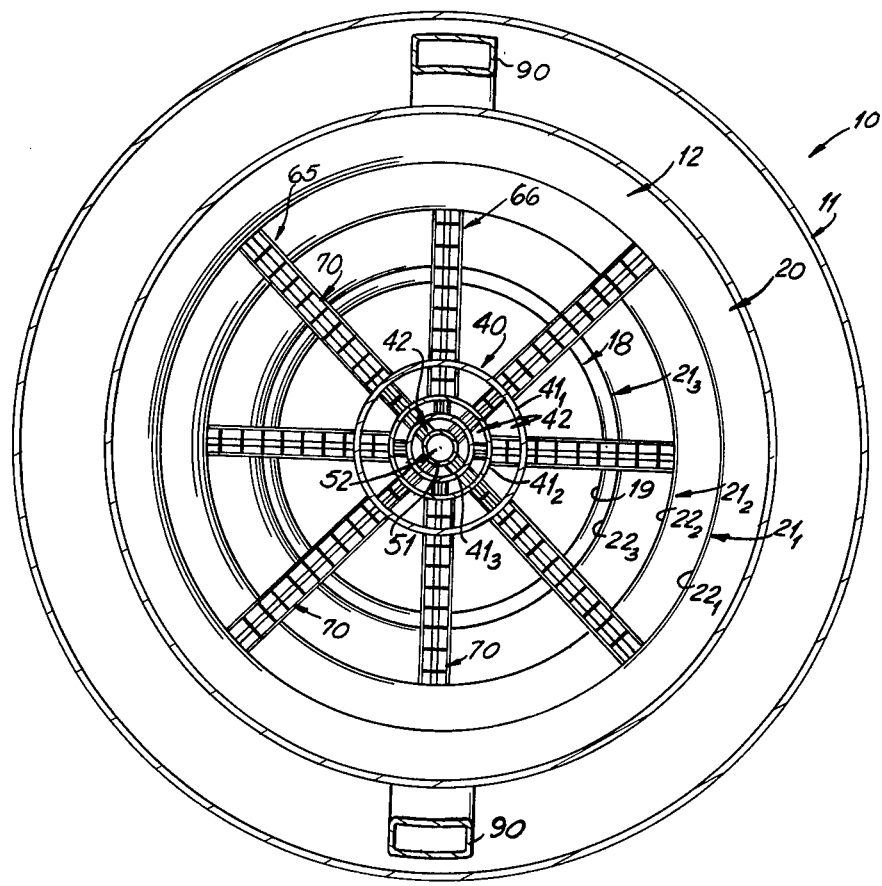
FIG. 2 is an enlarged transverse cross-sectional view taken generally along line 2—2 in FIG. 1B.
Figure 4:
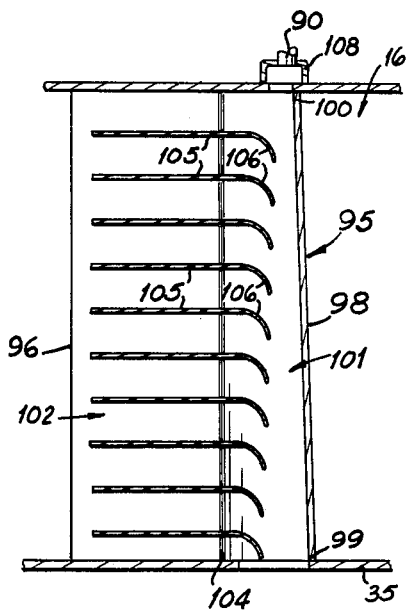
FIG. 4 is a longitudinal cross-sectional view taken along line 4—4 in FIG. 3.
Figure 6:
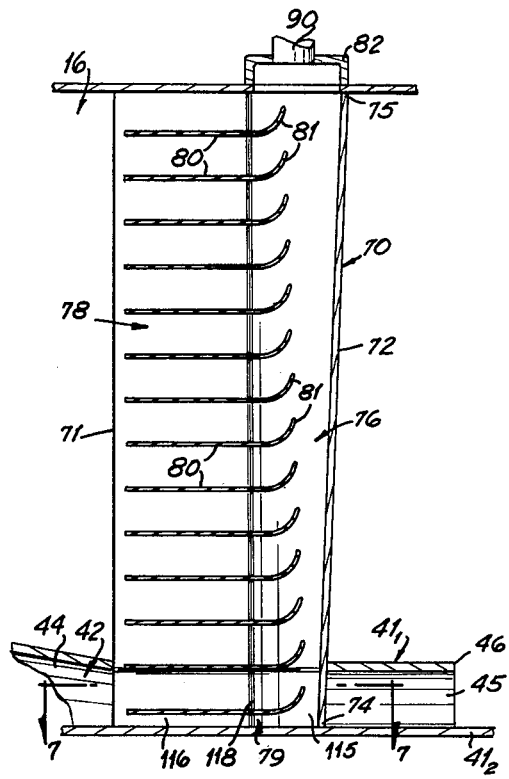
FIG. 6 is a longitudinal cross-sectional view taken generally along 6—6 in FIG. 5.

Preferably, the velocity of the exhaust gas streams issuing from the jet pumping tubes $41_1$–$41_3$ and 51 should be different between the different tubes. The gas stream velocity should be the greatest from the nozzle jet pumping tube 51 and decrease from tube to tube to the lowest at the venturi jet pumping tube $41_1$. This is illustrated in FIG. 8 which shows the downstream discharge ends of the various jet pumping tubes. In FIG. 8, the nozzle jet pumping tube 51 is provided with a nozzle section 110 with an inside diameter $d_{11}$ at its discharge end 50. The downstream end 49 of the innermost venturi jet pumping tube $41_3$ is also provided with a nozzle section 111 with an inside diameter $d_{12}$. The diameter $d_{11}$ is selected so that the difference between the passage cross-sectional area through nozzle section 110 and the cross-sectional area of the opening into the inlet section 54 in nozzle jet pumping tube 51 is greater than the difference between the effective cross-sectional area of the annular passage through the nozzle section 111 and the effective cross-sectional area of the annular opening into the inlet section 44 in venturi jet pumping tube $41_3$. Likewise, the diameter $d_{12}$ of the nozzle section 111 is selected so that the difference between the effective annular passage cross-sectional area through nozzle section 111 and the effective cross-sectional area of the annular opening into the inlet section 44 in venturi jet pumping tube $41_3$ is greater than the difference between the effective cross-sectional area of the annular discharge opening at the downstream discharge end 48 and the effective cross-sectional area of the annular opening into the inlet section 44 in venturi jet pumping tube $41_2$. The diameter $d_8$ is selected so that the effective cross-sectional area of the annular discharge opening at the downstream discharge end 48 and the effective cross-sectional area of the annular opening into the inlet section 44 in venturi jet pumping tube $41_2$ is greater than the difference between the effective cross-sectional area of the annular discharge opening at the downstream discharge end 46 and the effective cross-sectional area of the annular opening into the inlet section 44 in venturi jet pumping tube $41_1$. Because the exhaust gases from the burner combustion chamber 28 enters the inlet openings to all of the tubes $41_1$–$41_3$ and 51 at the same velocity and pressure, it will be seen that the exhaust gases exit the nozzle jet pumping tube 51 at the greatest velocity, exit the innermost venturi jet pumping tube $41_3$ at a lesser velocity, exit the next outboard venturi jet pumping tube $41_2$ at a still lesser velocity, and exit the outermost venturi jet pumping tube $41_1$ as the least velocity. This serves to increase the jet pumping effect through the venturi throats $22_1$–$22_3$ and 19 as one moves downstream through the engine 10 to insure that the air flow through passage 12 is always from its upstream leading end 14 toward is downstream trailing end 16.

This same effect can be achieved by using a separate combustion chamber (not shown) in the burner unit 25 for each of the venturi jet pumping tubes $41_1$–$41_3$ and for the nozzle jet pumping tube 51. These separate burner chambers would be operated so as to achieve the different velocities. The same effect could also be achieved by using secondary combustion chambers (not shown) associated with the different jet pumping tubes $41_1$–$41_3$ and 51.

An impaction/induction unit 60 is provided for supplying a combustible air mixture to the transfer chamber 36 in the burner unit 25. The impaction/induction unit includes a primary vane unit 61, a secondary vane unit 62 and a transfer vane unit 64. The primary vane unit 61 is located in the fresh air passage 12 so that the fresh air in passage 12 impacts into the unit 61 for separation while the exhaust gases from the exhaust jet pumping assembly 40 are used to induce separation of additional fresh air from passage 12. The secondary vane unit 62 is located in the nozzle section 18 and serves to separate part of the fresh air/exhaust gas mixture passing through the nozzle section 18. The separated fresh air/exhaust gas mixture from the primary and secondary vane units 61 and 62 is supplied to the transfer chamber 36 in burner unit 25 through the transfer vane unit 64. The transfer vane unit 64 is located in the inlet section 16 of air passage 12 so that part of the fresh air moving through passage 12 impacts into the transfer vane unit 64 for separation and supply to the transfer chamber 36. The fresh air/exhaust gas mixture from the primary and secondary vane units 61 and 62 is used to induce additional fresh air from passage 12 into the transfer vane unit 64.

The primary vane unit 61 includes a plurality of vane assemblies 65, 66, 68 and 69 serially arranged along the air passage 12 in the converging section 20. The upstreammost vane assembly 65 is located just upstream of the venturi subsection $21_1$, the next downstream vane assembly 66 located between venturi subsections $21_1$ and $21_2$, the next downstream vane assembly 68 located between venturi subsections $21_2$ and $21_3$ and the downstreammost vane assembly 69 located between the venturi subsection $21_3$ and the nozzle section 18.

Each of the vane assemblies 65, 66, 68 and 69 includes a plurality of radially extending vanes 70 circumferentially spaced around the air passage 12 with the vanes 70 of each vane assembly angularly offset from those of the adjacent vane assemblies so as not to interfere with the operation thereof. The vanes 70 in the vane assembly 65 extend from housing 11 across passage 12 through the outermost venturi jet pumping tube $41_1$ to the outside of venturi jet pumping tube $41_2$. The vanes 70 in the vane assembly 66 are located downstream of the venturi jet pumping tube $41_1$ and extend from housing 11 across air passage 12 to the outside of the venturi jet pumping tube $41_2$. The vanes 70 in the vane assembly 68 are located downstream of the venturi jet pumping tube $41_2$ and extend from housing 11 across air passage 12 to the outside of the venturi jet pumping tube $41_3$. The vanes 70 in the vane assembly 69 are located downstream of the venturi jet pumping tube $41_3$ and extend from the housing 11 across air passage 12 to the outside of the nozzle jet pumping tube 51.

Each of the impaction vanes 70 has a leading edge 71 facing the leading end 14 of the fresh air passage 12, a trailing edge 72 facing the trailing end 15 of the fresh air passage 12, an inboard end 74 at the exhaust jet pumping assembly 40 and an outboard end 75 at the housing 11. Each of the vanes 70 defines an air impaction passage 76 therein extending along the length thereof adjacent the trailing edge 72 of the vane 70. The air impaction passage 76 has an increasing cross-sectional size from its inboard end to its outboard end as will become more apparent. Each of the air impaction vanes 70 also defines an air inlet opening 78 extending along the length thereof and opening onto the leading edge 71 of the vane 70 so that a portion of the air flowing through the air passage 12 toward its trailing end 15 will be directed into the air inlet opening 78. A venturi passage 79 extends along the length of the impaction vane 70 and connects the air inlet opening 78 with the air impaction passage 76 so that the air passing into the impaction vane 70 through the air inlet opening 78 will pass through the venturi passage 79 and impact in the air impaction passage 76 to separate it from the rest of the air passing through the air passage 12. To guide the air passing into the vane 70, a plurality of air guide baffles 80 are positioned in the vanes 70 and extend from the air inlet opening 78 through the venturi passage 79 into the air impaction passage 76. These air guide baffles 80 are axially spaced from each other along the length of the impaction vane 70. Each of the air guide baffles 80 is provided with a curved lip 81 at its trailing end in impaction passage 76 and is angled outwardly toward the outboard end of the air impaction passage 76 to deflect the air passing into the air impaction passage 76 through the air inlet opening 78 and venturi passage 79 outwardly along the air impaction passage 76 toward the outboard end 75 of the vane 70. The air guide baffles 80 project into the air impaction passage 76 so that the lips 81 on the air guide baffles 80 form a series of venturis in the air impaction passage 76 whose throat areas increase in size from the inboard end of the vane 70 to its outboard end. Thus, the air flowing axially along the passage 76 past each lip 81 serves to induce additional air from air passage 12 into the impaction passage 76 by jet pumping action as it passes the lip 81 on the next outboard air guide baffle 80. It will also be noted that the lips 81 on air guide baffles are arranged such that air flowing into the air impaction passage 76 between adjacent lips 81 on the airguide baffles 80 will serve to induce air in the air impaction passage 76 inboard of the lip 81 on the most inboard of the adjacent air guide baffles 80 outwardly along the air impaction passage 76. Thus, it will be seen that the fastest moving of the air along the air impaction passage 76 and the air between adjacent air guide baffles 80 will serve to induce additional flow in the slower moving air. Usually, the air moving along the air impaction passage 76 will be the fastest moving as will become more apparent. The lips 81 also serve to keep the air, once separated in the air impaction passage 76, moving outwardly along the passage 76 to its outboard end without escaping through the air inlet opening 76 in the vane 70.

It will be noted that the inboard ends 74 of the vanes 70 in the impaction vane assembly 65 extend through the outermost venturi jet pumping tube $41_1$ and across the passage 42 therethrough to the next inboard venturi jet pumping tube $41_2$. Thus, it will be seen that a portion of the high velocity exhaust gases passing through the passage 42 in the outermost venturi jet pumping tube $41_1$ will pass into the inboard end of the air impaction passage 76 in vanes 70 to be separated from the exhaust gases through tube 41, and be directed outwardly axially along the passages 76 past the lips 81 on the air guide baffles 80. The velocity of these separated exhaust gases moving along impaction passages 76 in vanes 70 past the lips 81 is sufficient to cause additional fresh air from the air passage 12 to be induced into the impaction passages 76 through the inlet openings 78. The mixture of fresh air and exhaust gases pass out of the outboard ends 75 of vanes 70 as will become more apparent. The air/exhaust gas mixture will contain a sufficient amount of unburned air to support combustion in the combustion chamber 28 in burner unit 25 as will become more apparent.

The inboard ends of the vanes 70 in the vane assembly 66 are located adjacent the venturi jet pumping tube $41_2$ downstream of the discharge end 46 of the outermost venturi pumping tube $41_1$ so that the high velocity exhaust gases being discharged out of tube $41_1$ around tube $41_2$ will impinge against these inboard ends. Thus, a portion of these exhaust gases will be separated from the main exhaust gas stream from tube 41, and pass outwardly along vanes 70 in the same manner as that described for vane assembly 66. This, of course, serves to induce additional fresh air from air passage 12 into vanes 70 in the assembly 66 to form a combustible fresh air/exhaust gas mixture. Similar action is obtained with vanes 70 in vane assembly 68 since the inboard ends of the vanes are located adjacent the venturi jet pumping tube $41_3$ downstream of the discharge end 48 of the venturi jet pumping tube $41_2$. Similar action is also obtained with vanes 70 in vane assembly 69 since the inboard ends of the vanes are located adjacent the nozzle jet pumping tube 51 downstream of the discharge end 49 of the innermost venturi jet pumping tube $41_3$.

Figure 7:
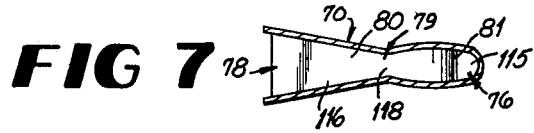
FIG. 7 is a cross-sectional view taken generally along line 7—7 in FIG. 6.
Figure 3:
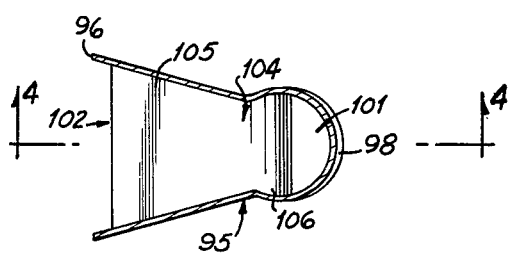
FIG. 3 is an enlarged cross-sectional view taken generally along line 3—3 in FIG. 1B.
Figure 5:
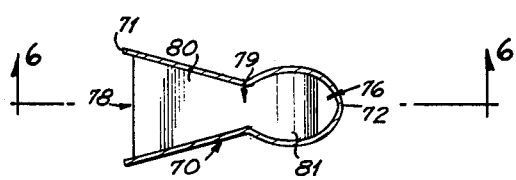
FIG. 5 is an enlarged cross-sectional view taken generally along line 5—5 in FIG. 1A.

Because of the velocity of the exhaust gases directed into the inboard ends of the vanes 70 and because it is desired that only a minimum amount of exhaust gases be separated for return to the combustion chamber 28 in the burner unit 25, the inboard portion 115 of each of the impaction passages 76 in vanes 70 has a reduced cross-sectional size as best seen in FIG. 7 as compared to the rest of passage 76 seen in FIG. 5. Likewise, the inboard portion 116 of each of the air inlet openings 78 in vanes 70 has an opening as seen in FIG. 7 at the leading edge 71 of vane 70 narrower than the rest of the inlet opening 78 as seen in FIG. 5. The inboard portion 118 seen in FIG. 7 of each of the venturi passages 79 in vanes 70 has a narrower throat than the rest of the venturi passage 79 as seen in FIG. 5. This serves to separate enough of the exhaust gases to induce air from passage 12 into vane 70 yet not enough of the exhaust gases to hinder combustion in burner unit 25 as will become more apparent.

It will be appreciated that, as soon as the exhaust gases from the venturi jet pumping tubes $41_1$–$41_3$ are discharged into the air passage 12, these exhaust gases start mixing with the fresh air in passage 12 to form a fresh air/exhaust gas mixture. Thus, the vanes in the vane assemblies 66, 68 and 69 will be separating a mixture of fresh air and exhaust gases from the passage 12. For sake of simplicity, however, the mixture in passage 12 will be referred to as air even though it contains exhaust gases in certain portions of the air passage 12.

The fresh air/exhaust gas mixture passing out of the outboard ends 75 of vanes 70 in the vane assemblies 65, 66, 68 and 69 are collected in annular primary collection manifolds 82. These manifolds 82 are mounted in housing 11 around the air passage 12 and the mixture then is directed to the transfer chamber 36 in the burner unit 25 as will become more apparent.

The secondary vane unit 62 includes a plurality of radially extending vanes 85 circumferentially spaced about the air passage 12 in the nozzle section 18. The vanes 85 are angularly offset from the vanes 70 in the downstreammost vane assembly 69 of the primary vane unit 61 to prevent interference. Each of the vanes 85 is mounted on housing 11 at its outboard end 86 and extends inwardly therefrom into passage 12. Vanes 85 have a length $L_2$ such that the inboard end 88 is located sufficiently outboard of the exhaust gas stream issuing from the nozzle jet pumping tube 51 so that it does not impinge against the vane 85. The vanes 85 are similar in construction to vanes 70 so that the air passing through the nozzle section 18 in air passage 12 impinges against vanes 85 and a portion thereof is separated. This separated air/exhaust gas mixture passes outwardly through the vanes 85 into an annular secondary collection manifold 89 around passage 12.

The primary and secondary collection manifolds 82 and 89 are connected to the transfer vane unit 64 via transfer ducts 90 connected to each of the manifolds 82 and 89. Thus, the separated air/exhaust gas mixture in the manifolds 82 and 89 are transferred forwardly in engine 10 to the transfer vane unit 64.

The transfer vane 64 includes an upstream vane assembly 91 and a downstream vane assembly 92 serially arranged along the air passage 12 in the inlet section 16 around the burner unit 25. Each of the vane assemblies 91 and 92 includes a plurality of radially extended vanes 95 circumferentially spaced around the air passage 12 with the vanes 95 of vane assemblies 91 and 92 being angularly offset with respect to each other so as not to interfere with the operation thereof. The vanes 95 in the downstream vane assembly 92 are also angularly offset from the vanes 70 in the upstreammost vane assembly 65 so as not to interfere with the operation thereof. The vanes 95 in the vane assemblies 91 and 92 extend from the housing 11 across the passage 12 to the outer chamber wall 35 around the burner unit 25. Not only do the vanes 95 serve to transfer the separated fresh air/exhaust gas mixture from the vane units 61 and 62, they also serve to separate fresh air from the air passage 12 in the vicinity of the vanes 95 for supply to the burner unit 25. To maintain the proper fresh air to exhaust gas ratio in the combustible mixture supplied to the burner unit 25, more vanes 95 may be required in each vane assembly 91 and 92 than the number of vanes 70 in each vane assembly 65, 66, 68 and 69.

The vanes 95 are similar in construction to the vane 70 in the primary vane unit 61. Each of the vanes 95 has a leading edge 96 facing the leading end 14 of the air passage 12 and a trailing edge 98 facing the trailing end 15 of the air passage 12, and inboard end 99 at the outer wall 35 of the burner unit 25 and an outboard end 100 at the housing 11. Each of the vanes 95 defines an air impaction passage 101 extending along the length thereof adjacent the trailing edge 98 of the vane 95. The air impaction passage has an increasing cross-sectional size from its outboard end 100 to its inboard end 99 as will become more apparent. Each of the vanes 95 also defines an air inlet opening 102 extending along the length thereof and opening onto the leading edge 98 of the vane 95 so that a portion of the fresh air flowing through the inlet section 16 of the air passage 12 will be directed into the air inlet opening 102. A venturi passage 104 extends along the length of the impaction vane 95 and connects the air inlet opening 102 with the air impaction passage 101 so that the air passing into the impaction vanes 95 through the air inlet openings 102 will pass through the venturi passages 104 and impact into the air impaction passages 101 to separate it from the rest of the fresh air passing through the inlet section 16 of the air passage 12. To guide the air passing into the vanes 95, a plurality or air guide baffles 105 are positioned in the vanes 95 and extend from the air inlet opening 102 through the venturi passage 104 into the air impaction passage 101. These air guide baffles 105 are axially spaced from each other along the length of the impaction vanes 95 and each is provided with a curved lip 106 at its trailing end in impaction passage 101. The curved lips 106 are angled inwardly toward the inboard end 99 of the air impaction passage 101 to deflect the fresh air passing into the air impaction passage 101 through the air inlet opening 102 inwardly along the air impaction passage 101 toward the inboard end 99 of the vane 95. These air guide baffles 105 project into the air impaction passage 101 so that the lips 106 on the air guide baffles 105 form a series of venturis in the air impaction passage 101 whose throat areas increase in size from the outboard end of the vane 95 to its inboard end. Thus, the air flowing axially along the passage 101 past each lip 106 serves to induce additional fresh air from within the inlet section 16 of the air passage 12 into the impaction passage 101 by jet pumping action as it passes the lip 106 on the next inboard air guide baffle 105. These lips 106 on the air guide baffles 105 also serve to keep the separated fresh air within the air impaction passage 102 for passage along the length of the vanes 95 toward their inboard ends.

The inboard end of the air impaction passages 101 in the vanes 95 open into the transfer chamber 36 around the burner can assembly 26 so that this separated air can pass through the transfer chamber 36 and be forced into the combustion chamber 28 in the burner can assembly 26 by the combustion jet pump unit 29. The outboard ends of the air impaction passages 101 in vanes 95 are connected to the transfer ducts 90 from the primary and secondary vane units 61 and 62 by angular distributing manifolds 108 in housing 11 around the air passage 12 at the outboard ends 100 of the vanes 95. Thus, the separated air/exhaust gas mixture from the primary and secondary vane units 61 and 62 will be forced axially inwardly along the air impaction passages 101 in the vanes 95 into the transfer chamber 36 in the burner unit 25. It will also be appreciated that the forcing of the air/exhaust gas mixture from the primary and secondary vane units 61 and 62 will induce additional fresh air into the vanes 95 from the inlet section 16 of the air passage 12. As a result, the mixture of fresh air and exhaust gases supplied to the transfer chamber 36 will contain sufficient unburned air to support combustion in the combustion chamber 28.

In summary then, it will be seen that the exhaust gases being discharged from the venturi jet pumping tubes 41 and the nozzle jet pumping tube 51 will cause fresh air to be drawn into the inlet section 16 of the air passage 12 so that a portion of the incoming fresh air will be separated by the vanes 95 in the vane assemblies 19 and 92. At the same time, it will be seen that the air/exhaust gas mixture separated from the air passing through the air passage 12 by the primary and secondary vane units 61 and 62 will be used to induce additional fresh air from the inlet section 16 of the air passage 12 into the vanes 95 to supply a combustible air mixture to the transfer chamber 36 in the burner unit 25. The engine 10 is started by forcing the fuel from the injector nozzles 34 in the jet pump injector assembly 31 through the pumping venturi 30 at the inlet end of the combustion chamber 28 so that sufficient air to support combustion will be induced into the combustion chamber 28. This air/fuel mixture is ignited conventionally using an injector plug (not shown). After ignition, the discharging exhaust gases from the combustion chamber 28 will be used to induce air flow through the air passage 12 to supply additional air to the transfer chamber 36 to increase the amount of combustible air being supplied to the combustion chamber 28 to support combustion.

By separating the exhaust gases into several separate streams, the amount of jet pumping action to force air through the air passage 12 is significantly increased. Further, the diameter required in nozzle section 18 to achieve the necessary thrust can be used without loss of jet pumping action therethrough as would be encountered when using a single exhaust gas stream from the combustion chamber.

I claim:

1. A staged induction engine comprising:
an air duct having a leading end and a trailing end and defining an air passage therethrough open to the atmosphere at the leading and trailing end of said duct so that air can flow through said passage from its leading end to its trailing end, said air passage including an inlet section adjacent its leading end of a first diameter, a nozzle section at its trailing end having a minimum second diameter smaller than said first diameter and a converging section connecting said inlet section and said nozzle section, said converging section varying from said first diameter to said second diameter, said converging section defining a plurality of venturis therein axially spaced from each other along the length of said converging section, each of said venturis having a throat of a diameter smaller than the throat of the next upstream of said venturis;
a burner unit defining combustion chamber therein, a burner inlet thereto and a burner outlet therefrom; and
exhaust jet pumping means operatively associated with said burner outlet, said exhaust jet pumping means including a plurality of venturi jet pumping tubes corresponding in number to said venturis, each of said venturi jet pumping tubes defining an exhaust passage therethrough having an upstream exhaust inlet in communication with the burner outlet so that exhaust gases from said combustion chamber are forced therethrough, each of said exhaust passages having a downstream exhaust outlet from which the exhaust gases are discharged, one of said exhaust outlets being positioned upstream of the throat of each of said venturis so that the exhaust gases will be discharged through the throat of said venturi associated therewith to force air in the air passage through said air duct upstream of said venturi through said venturi under jet pumping action.

2. The staged induction engine of claim 1 further including a plurality of air impaction vanes mounted in said air passage, each of said air impaction vanes defining vane impaction passage therein communicating with said air passage and said burner inlet so that a portion of the air flowing through said air passage will impact into said vane impaction passage to be separated from the air flowing through said air passage and be supplied to said burner inlet to support combustion in said combustion chamber.

3. The staged induction engine of claim 2 wherein said impaction vanes are arranged so that a portion of the exhaust gases discharged from said exhaust jet pumping tubes impact into said vane impaction passages to flow along said vane impaction passages and induce air from said air passage into said vane impaction passages.

4. The staged induction engine of claim 2 wherein each of said impaction vanes has opposed ends with said vane impaction passage extending between the opposed ends of said vane, one end of the vane impaction passage operatively connected to the burner inlet and the other end of the vane impaction passage in communication with the exhaust gases discharged from said exhaust gas pumping tubes so that a portion of the exhaust gases is forced through said vane impaction passage toward said one end thereof, said vane impaction passage communicating with the air in said air passage intermediate its ends so that the exhaust gases flowing through said vane impaction passage induces air from said air passage into said vane impaction passage.

5. The staged induction engine of claim 1 wherein said nozzle section defines a venturi throat therein and wherein said exhaust jet pumping means further includes a nozzle jet pumping tube defining an exhaust passage therethrough having an upstream end in communication with the burner outlet so that a portion of the exhaust gases from the combustion chamber are forced therethrough and a downstream end from which the exhaust gases are discharged, the downstream end positioned upstream of the venturi throat in said nozzle section so that the exhaust gases will be discharged through the venturi throat in said nozzle section to force air in said air passage upstream of the nozzle venturi throat through the nozzle section under jet pumping action.

6. The staged induction engine of claim 5 wherein said venturi jet pumping tubes and said nozzle jet pumping tube are arranged concentrically of each other.

7. The staged induction engine of claim 4 further including a plurality of transfer vanes mounted in said air passage, each of said transfer vanes defining an air transfer passage therein having opposed ends, one end of said transfer passage operatively connected to said one end of said vane impaction passages in said impaction vanes and the other end of said transfer passage connected to said burner inlet so that the air and exhaust gases from said impaction vanes pass through said transfer passages in said transfer vanes to said burner inlet, said transfer passage in each of said transfer vanes in communication with said air passage so that the air and exhaust gases from said impaction vanes passing along said transfer passages induce additional fresh air from said air passage into said transfer passages in said transfer vane for supply to said burner inlet.

8. The staged induction engine of claim 1 wherein said exhaust packages through said venturi jet pumping tubes are sized so that the velocity of the exhaust gases being discharged from each of said pumping tubes through one of said venturis is greater than the velocity of the exhaust gases being discharged through the adjacent of said venturis upstream thereof.

* * * * *